March 22, 1955  M. R. HUTCHISON, JR  2,704,433
ESCAPEMENT SPRING MOUNT FOR AN ARBOR
Filed Feb. 12, 1954

Miller R. Hutchison, Jr.
INVENTOR.

BY G. D. O'Brien
Q. Baxter Warner
ATTORNEYS

United States Patent Office 2,704,433
Patented Mar. 22, 1955

2,704,433

ESCAPEMENT SPRING MOUNT FOR AN ARBOR

Miller R. Hutchison, Jr., Rochester, N. Y., assignor, by mesne assignments, to the United States of America as represented by the Secretary of the Navy Application February 12, 1954, Serial No. 410,058

2 Claims. (Cl. 58—115)

This invention relates to parts used in certain artillery fuses, and more particularly to a device for mounting the standard escapement spring in an escapement arbor.

In the known prior art escapement spring mounting devices, the arbor is provided with a circular hole, and the spring is secured in the hole by means of a circular wedge. The wedge deforms the spring within the hole into a shape generally conforming to the radius of curvature of the hole. This distortion is also evident in the spring for a substantial distance beyond the arbor and for proper operation requires manual straightening. The resultant cold working of the spring metal from the straightening renders it liable to early fatigue failure, and although metals having the proper physical attributes to resist such failures are known, they are not readily available for such use.

My invention hereinafter disclosed overcomes the objectionable features of the known prior art mounting devices and provides a simple, efficient and inexpensive escapement spring mount. I provide in combination with a bored escapement arbor, a slotted arbor pin. The spring is fitted into the slot in the pin, and the pin, together with the spring, are positioned in the arbor bore. The pin is then upset in the bore by squeezing it endwise, and it thereby securely grips the spring and the internal wall of the arbor bore.

The primary object of the present invention therefore is to provide a device for mounting an escapement spring in an escapement arbor that eliminates the fatigue failures of the spring due to distortion and cold working of the spring in assembling it in the arbor.

Other objects and advantages will become apparent to those skilled in the art from the following description with reference to the drawings in which like characters denote like parts and wherein.

Figure 2:
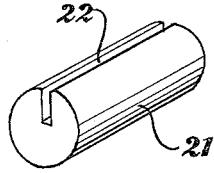
Figure 2 is a perspective view of the arbor pin of my invention.

In the drawings the escapement arbor 11 is shown as being a generally cylindrical elongated member provided with bearing surfaces 12 and 13 on its opposed ends adapted to cooperate with suitable bearings for mounting the arbor for oscillatory movement. An intermediate portion 14 of arbor 11 having a slightly enlarged diameter is provided with diametrically opposed flats 15. A through bore 16 between flats 15 has an axis lying in the plane of and perpendicular to the longitudinal axis of arbor 11. An arbor pin 21 as shown in Figure 2, which is made of brass or other compressible and readily deformable metallic material, and having a substantially cylindrical shape, has a diameter slightly less than the diameter of bore 16 and a length slightly larger than the length of bore 16 between flats 15. A longitudinal slot 22 extending between the opposed ends of pin 21 has a width and depth slightly larger than the corresponding dimensions of escapement spring 23 whereby the spring 23 may be readily positioned within the slot 22.

Figure 1:
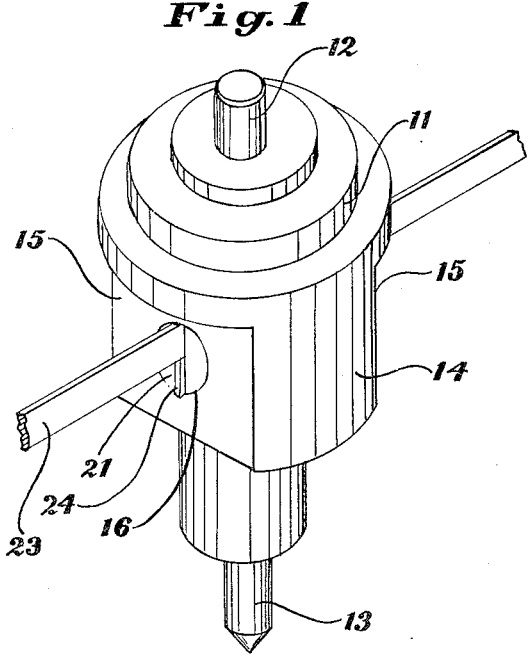
Figure 1 is a perspective view illustrating the assembled relation of parts utilizing my invention.
Figure 3:
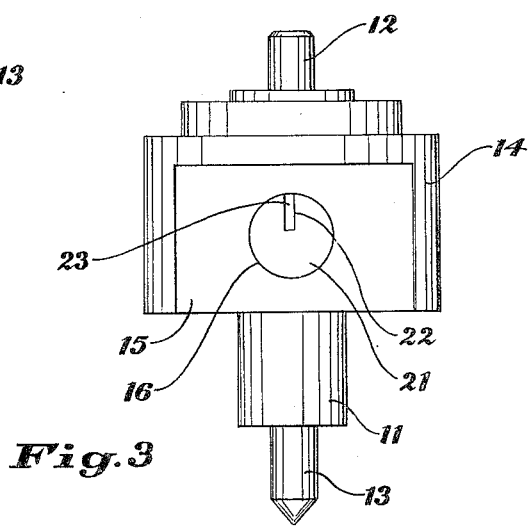
Figure 3 is a front elevation view of the asesmbly prior to upsetting the arbor pin in the arbor bore.

In assembling my invention, spring 23 is positioned in the slot 22 of pin 21. The pin 21 together with the spring 23 is then positioned in bore 16 as shown in Figure 3, with the opposed ends of the pin protruding slightly from the ends of the bore 16 adjacent flats 15. The pin is then upset in the bore 16 by squeezing the opposed ends of the pin 16 as by any suitable means well known in the art. The resultant deformation of the pin 21 forces said pin to firmly and securely grip both the spring 23 and the internal wall of bore 16. The assembled arbor and spring are illustrated in Figure 1. Reference character 24 of Figure 1 designates the excess or flash material resulting from the upsetting of pin 21. I have found it to be advisable to provide a groove in the upset dies in order to direct the flash material 24 to the position shown where it can not interfere with the free action of spring 23.

As will be recognized by those skilled in the art, my invention provides a simple and efficient escapement spring mount in which the necessity of straightening the spring after assembly in escapement arbor, which causes fatigue failures in the spring, is eliminated. It is realized that many variations of the illustrated embodiment are possible and will be readily recognized by those skilled in the art, and therefore the present disclosure is intended to be illustrative only, and the scope of the invention is defined in the appended claims.

Having now particularly described my invention, what I desire to secure by Letters Patent of the United States, and what I claim is:

1. In an escapement arbor assembly the combination of an arbor to be mounted for oscillatory movement about an axis of said arbor and having an opening extending transversely to said axis, a spring to be secured to said arbor, a spring mounting means comprising a pin provided with means for receiving a section of said spring, said pin being formed of a relatively soft, readily deformable metallic material and having such dimensions as to be receivable in said opening, whereby upon compression and deformation of said pin said section is secured in said opening.

2. In an escapement arbor assembly the combination of an arbor to be mounted for oscillatory movement about an axis of said arbor and having a bore extending substantially transverse to said axis, means for securing a spring in said bore comprising a generally cylindrical pin formed of a relatively soft, readily deformable metallic material and having a diameter slightly smaller than the diameter of said bore, said pin being provided with a longitudinally extending radial slot for receiving a section of said spring, whereby upon insertion of said pin together with said spring in said bore and deformation of said pin, said spring is secured to said arbor.

References Cited in the file of this patent

UNITED STATES PATENTS

| | | |
|---|---|---|
| 1,556,907 | Bold | Oct. 13, 1925 |
| 1,910,269 | Sunderland | May 23, 1933 |
| 2,049,953 | Forster | Aug. 4, 1936 |
| 2,622,903 | Lavarack | Dec. 23, 1952 |